United States Patent [19]

Maurice et al.

[11] Patent Number: 4,905,160

[45] Date of Patent: Feb. 27, 1990

[54] DEVICE FOR REGULATING THE OPERATION OF A CHEMICAL TREATMENT PLANT, TO IMPROVE EFFICIENCY BY ATTENUATION OF THE VARIANCES OF THE REGULATING PARAMETERS

[75] Inventors: Jacques Maurice, Pau; Gérard Butte, Mourenx; Alain Vignau, Beuste; Marc Albertini, Pau, all of France

[73] Assignee: Societe Nationale Elf Aquitaine, Courbevoie, France

[21] Appl. No.: 141,781

[22] Filed: Jan. 11, 1988

[30] Foreign Application Priority Data

Jun. 2, 1987 [FR] France ................................ 87 07693

[51] Int. Cl.[4] .............................................. G06G 7/58
[52] U.S. Cl. ..................................... 364/500; 364/510; 364/502; 364/166; 318/571; 318/644
[58] Field of Search ............................... 364/500–502, 364/510, 579, 148, 152, 166; 318/567, 571, 572, 638, 642–644

[56] References Cited

U.S. PATENT DOCUMENTS

| | | | |
|---|---|---|---|
| 4,473,536 | 9/1984 | Carberg et al. | 364/500 |
| 4,534,637 | 8/1985 | Smith et al. | 364/500 |
| 4,536,606 | 8/1985 | Hobbs | 364/500 |
| 4,739,467 | 4/1988 | Furusawa | 364/166 |

Primary Examiner—Parshotam S. Lall
Assistant Examiner—Brian M. Mattson
Attorney, Agent, or Firm—Oblon, Spivak, McClelland, Maier & Neustadt

[57] ABSTRACT

A device for regulating the operation of a chemical treatment plant, by attenuation of the variances of the regulating parameters, has a calculation circuit connected to a measuring device for measuring flows of compounds at the input of the plant and measuring devices for measuring the contents of residual input compounds still present at the output of the plant. The calculation circuit performs coherence processings of the measured values to attenuate the variances of these values. The measurement provides a set-point signal which is used for the regulation of the plant.

4 Claims, 1 Drawing Sheet

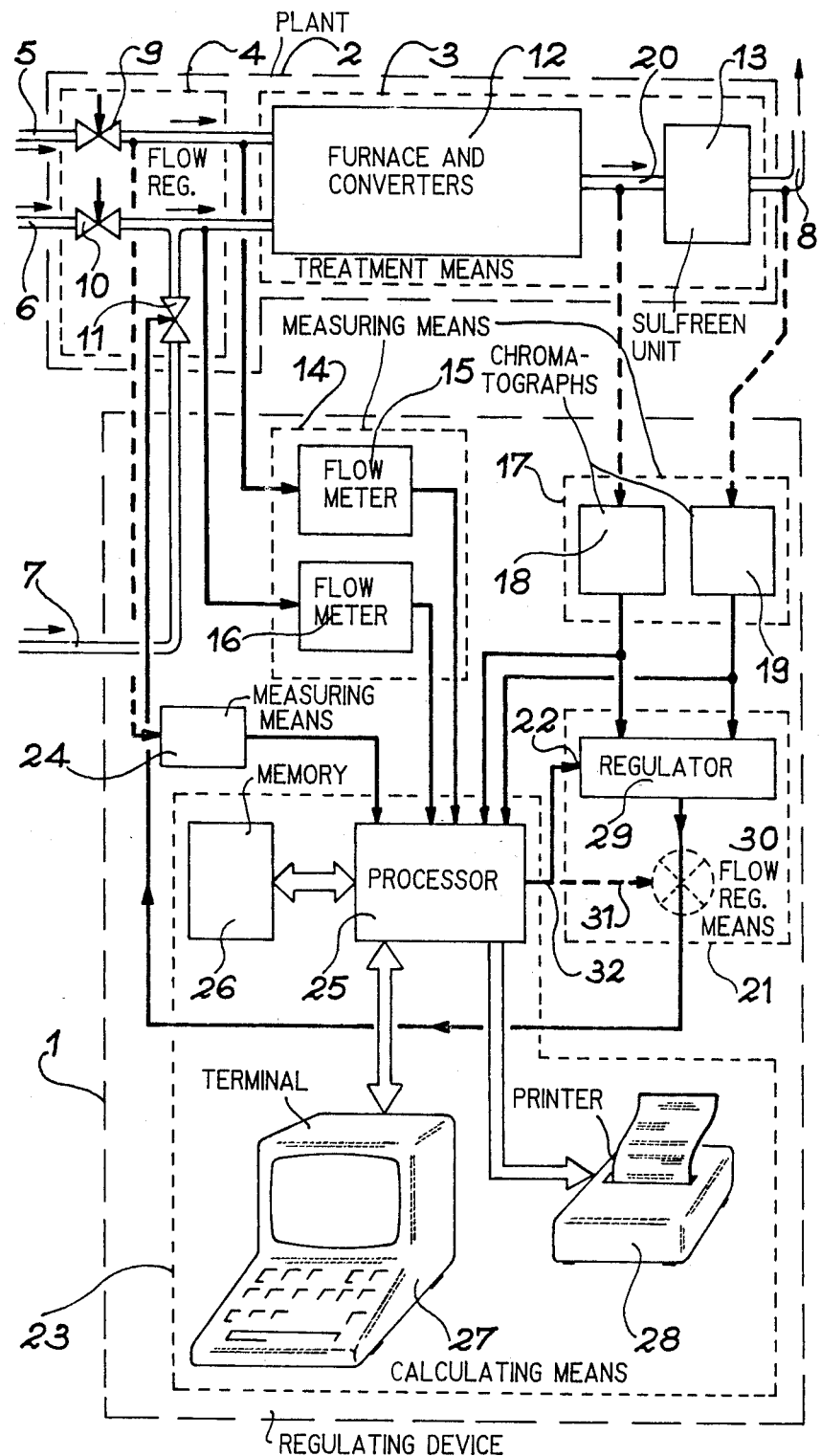

DEVICE FOR REGULATING THE OPERATION OF A CHEMICAL TREATMENT PLANT, TO IMPROVE EFFICIENCY BY ATTENUATION OF THE VARIANCES OF THE REGULATING PARAMETERS

DESCRIPTION

This invention relates to a device for regulating the operation of a chemical treatment plant to improve efficiency by attenuation of the variances of the regulating parameters. It applies to any chemical treatment plant which receives reactive chemical compounds as input to provide as output at least one chemical element present in the input compounds, the operation of the plant having to exhibit the best efficiency for given conditions of operation.

This invention applies particularly to a plant for obtaining sulfur by the reaction of hydrogen sulfide $H_2S$ with the oxygen of the air.

It is known that regulating the operation of a chemical treatment plant is generally obtained by a servocontrol using the values of parameters provided by characteristic sensors of the element or elements or compounds obtained at the output of the plant. These values make it possible to regulate the operation of the plant thanks to regulating means to which a set-point signal is applied, as well as signals corresponding to certain parameters (for example, the contents of the residual compounds at the output of the plant). These regulating means provide a control signal making it possible in particular to control means for regulating flows of compounds introduced into the plant.

This type of regulation, well known in the prior art, uses at least one regulating loop and exhibits drawbacks which result from the fact that the values of the parameters provided by the sensors are values approaching these characteristic parameters and not very precise values. Consequently, a regulating device operating directly from the values of characteristic parameters provided by sensors does not make it possible to obtain an optimum regulating set-point so that the chemical treatment plant operates with an optimum efficiency.

This is the case, for example, for a treatment plant that makes it possible to obtain sulfur from the reaction of hydrogen sulfide $H_2S$ and the oxygen of the air, according to the well known CLAUS reaction.

This type of plant comprises chemical treatment means which have in particular, at its input, a furnace connected to an adjustable flow means. These means make it possible to inject into the furnace input reactive chemical compounds consisting essentially of hydrogen sulfide $H_2S$ and air whose oxygen reacts with a part of the hydrogen sulfide according to the reaction:

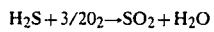

At the output of the furnace, the reaction products are introduced in one or more converters containing catalysts that make it possible, thanks to the so-called "Claus" reaction, to cause the sulfur dioxide $SO_2$ produced to react on the hydrogen sulfide. This reaction is as follows:

The sulfur is therefore available at the output of the converters and the total reaction is written:

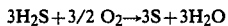

The water produced is eliminated in the form of steam and the residual gases of the input reactive compounds can be further partially eliminated thanks to an additional catalytic treatment unit such as the one used in the "sulfreen" catalytic process or any other process.

In this example of chemical treatment plant, the regulating of the operation of the plant known as "sulfur plant" is performed by acting on the combustion air flow introduced at the input of the furnace.

In a way known in the prior art, the regulation of this type of plant is performed in the following manner: thanks to sensors consisting essentially of a concentration analyzer, the contents are measured of the input residual reactive constituents which are still present at the output of the plant. These constituents are, in the example considered, essentially hydrogen sulfide $H_2S$ and sulfur dioxide $SO_2$. For the plant to operate at its best efficiency, it is necessary that these contents be as close as possible to 0. The values of these contents are applied to regulating means which also receive a set-point signal. These regulating means provide a control signal of a solenoid valve for adjusting the airflow injected at the input of the plant.

The set-point signal applied to the regulating means theoretically makes it possible, thanks to a supply of additional air at the input of the plant, to bring the contents of hydrogen sulfide $H_2S$ and of sulfur dioxide $SO_2$, present at the output of the plant back to a zero value. This set-point signal, of course, depends on the contents of these residual gases measured by the analysis means (chromatographic analyzer, for example), placed at the output of the plant. However, the values of these contents are measured approximately and in this type of known plant, the set-point signal applied to the regulating means does not make it possible to cause the airflow injected at the input of the plant to vary so that at its output the contents of residual gases tend toward zero values. Furthermore, the sole measurement of the contents of residual gases at the output of the plant are not sufficient parameters to make it possible to regulate the latter at its maximum efficiency. Finally, although generally the flows of the reactive components introduced at the input of the plant are measured, the values of these flows are not taken into account for the regulation.

The invention has as its object to remedy the drawbacks of the known devices for regulating the operation of a chemical treatment plant, particularly the taking into account of the values of a large number of parameters, and by a corrective calculation of the values of these parameters to make it possible to regulate the operation of the plant at a maximum efficiency. This corrective calculation is, in fact, a coherence calculation of the values of the measured parameters.

The invention has as its object a device for regulating the operation of a chemical treatment plant to improve the efficiency by attenuation of the variances of the adjustment parameters, this plant comprising chemical treatment means connected to adjustable flow means feeding respectively the chemical treatment means with input reactive chemical compounds, this plant providing at output at at least one chemical element present in the input compounds, the regulating device comprising measuring means providing signals of measurement of the flows of the input compounds, means providing signals of the measurement of the contents of the input residual compounds which are still present at the output of the treatment means, flow regulating means connected to the means for measuring contents of residual compounds and to at least one of the adjustable flow means, these regulating means receiving a set-point signal to apply a signal to the adjustable flow means modifying the flow of the corresponding input compound, so as to cause the contents of the output residual compounds to tend toward zero values, characterized in that it further comprises calculation means connected to the means for measuring flows of the input compounds to means for measuring the contents of the residual compounds and to measuring means providing measurement signals of contents of input compounds, these calculation means performing coherence processings of the measurement values of flows and contents to provide on an output the set-point signal applied to the regulating means.

According to a first embodiment of the invention, the regulating means comprise a flow regulator providing on an output a corrected control signal of a solenoid valve of the adjustable means.

According to another embodiment of the invention, the regulating means comprise a flow regulator one output of which provides a control signal of a solenoid valve of the adjustable means, and an adder connected by an input to the output of the regulator, another input of this adder being connected to the output of the calculation means to receive the set-point signal, an output of this adder providing a corrected control signal of a solenoid valve of the adjustable flow means.

Finally, according to another characteristic, the input reactive compounds are sulfurous acid gas and air, the element at the output being sulfur.

The characteristics and advantages of the invention will come out better from the following description given with reference to the single accompanying figure. This figure diagrammatically represents a device according to the invention, for regulating the operation of a chemical treatment plant at a maximum efficiency.

Regulating device 1 makes it possible to regulate the operation of a plant 2, to improve the efficiency, by attenuation of the variances of the regulating parameters.

Plant 2 comprises chemical treatment means 3 connected to adjustable flow means 4 that feed respectively chemical treatment means 3, with input reactive compounds. These reactive compounds are applied to ducts 5, 6, 7 of flow regulating means 4, which will be described in detail below. This plant provides as output 8 at least one chemical element present in the input compounds.

In case the device is used in a plant which makes it possible to obtain sulfur from the reactions described above, hydrogen sulfide $H_2S$ is applied, for example, to duct 5 connected to treatment means 3 by a flow adjustment valve or a solenoid valve 9.

Duct 6 receives the air containing the oxygen necessary for the reaction. This duct is connected to treatment means 3 by a flow adjustment valve or solenoid valve 10. A duct 7 also receives air necessary for the reaction. This duct is connected to treatment means 3 by a flow adjustment valve or solenoid valve 11. It is, in fact, thanks to this valve 11 associated with regulating device 1, that the plant operates at its optimum efficiency, as will be seen in detail below. In this example, treatment means 3 comprises the furnace and converters 12 as well as a so-called "sulfreen" unit 13 mentioned above and provides sulfur with a high degree of purity on its output 8.

Regulating device 1 comprises means 14 for measuring the flows of input reactive compounds. In the case of a plant for obtaining sulfur, these measuring means 14 comprise flow meters 15, 16 making it possible to measure respectively the flows of hydrogen sulfide and air injected into the plant.

The regulating device also comprises means 17 for measuring the contents of the input compounds which are still present at the output of the plant and which are therefore residual. In the case of a plant for obtaining sulfur, the means for measuring the content of the residual compounds comprise, for example, two chromatographs 18, 19 which make it possible to determine the contents of hydrogen sulfide gas in the output residual compounds. These contents are measured at output 20 of the final converter of the treatment means, as well as at output 8 of the "sulfreen" unit. Measuring means 17 provides signals for measuring these contents on their respective outputs.

Finally, the regulating device comprises flow regulating means 21 connected to means 17 for measuring the content of residual compounds, as well as at least one of the adjustable flow means 4. In the example of a plant for obtaining sulfur, regulating means 21 are connected to valve 11 making it possible to regulate the flow of air introduced into this plant (additional regulating air). The regulating means receives a setpoint signal on an input 22; this signal makes it possible, as will be seen in detail below, to apply a signal modifying the flow of the corresponding input compound (airflow in the application under consideration) to one of adjustable flow means 4 (valve or solenoid valve 11 in the application under consideration). This modification of the flow of the input compound makes it possible to cause the contents of the residual compounds to tend toward zero values at the output of the plant.

According to the invention, the device also comprises calculation means 23 connected to means 14 for measuring the flows of the input compounds, to means 17 for measuring the contents of the residual compounds at the output of the plant, as well as to measuring means 24 which provide signals for measuring contents of input compounds. These means for measuring the contents of the input compounds, in the application under consideration, consist of a chromatograph making it possible to determine in particular, in the treated acid gas, the contents of hydrogen sulfide $H_2S$, carbon dioxide $CO_2$, methane $CH_4$, ethane $C_2H_6$, benzene $C_6H_6$, . . . for example.

Calculation means 23 performs coherence processings of the values of the measurements of flows and contents received from the various measuring means. Calculation means 23 provides to output 32 the set-point signal applied to regulating means 21. The coherence processings performed by calculation means 23 will be described in detail below.

Calculation means 23 comprises, for example, a treatment processor 25 connected in a known way to storage means 26, to a terminal 27 with a keyboard and screen, and to a printer 28. Storage 26 makes it possible, in particular, to enter programs necessary for the coherence processings. Terminal 27 with keyboard and screen makes it possible to interact with processor 25, while printer 28 makes possible an entry of the results of the measurements, for example.

In a first embodiment of the device of the invention, the set-point signal available on output 24 of calculation means 23 and resulting from the coherence processings performed on the values of the measurements, is applied directly to a flow regulator 29; the output signal of this regulator directly controls solenoid valve 11 which, in the application under consideration, makes it possible to regulate the airflow at the input. This regulator 29 also receives the signals measuring the contents of the residual compounds at the output of the plant.

In another embodiment of the device of the invention, regulating means 21 comprises, in addition to regulator 29, an adder 30 to which the output signal of regulator 29 is applied. The output signal of calculation means 23 is no longer applied to input 22 of this regulator, but to adder 30, as connection 31 shows. An output of adder 30 provides a corrected control signal of the solenoid valve of adjustable flow means 4.

The coherence processing will now be explained in detail from a calculation example:

A pipe which transports an incompressible fluid is considered and on this pipe are installed two mass flow meters A and B.

Flow meter A has a turbine sensor and flow meter B has a vacuum-generating orifice sensor, for example. A simultaneous plotting of the two apparatuses gives:

For flow meter A, the value $m_A = 100$
For flow meter B, the value $m_B = 105$

Under these conditions, there is a measurement of a single magnitude by independent means which give two different values of the measurement noted as M in what follows.

It is a matter of calculating two values A and B closer to M than values $m_A$ and $m_B$ are. The maker of apparatus A indicates that he has performed, on flow M, a series of experiments which have given him a set $W_A$ of measurements of M.

The standard deviation of set $W_A$ is $s_A = 2$ for example, and its mean is M.

Set $W_A$ has a normal distribution law, i.e., the probability density of the law is, in a known way:

$$\frac{1}{S_A \sqrt{2\pi}} \cdot e^{-\frac{1}{2}(\frac{M-m}{S_A})^2}$$

The maker of apparatus B indicates that he has also performed a series of n experiments on flow M and that he has obtained the set $W_B$ of the measurements of M. The standard deviation of set $W_B$ is $s_B = 4$, for example, and its mean is M.

This set also has a probability density:

$$\frac{1}{S_B \sqrt{2\pi}} \cdot e^{-\frac{1}{2}(\frac{M-m}{S_B})^2}$$

In set $W_A$, the probability of obtaining a value $m'_A$ as close as possible to value $m_A$ is expressed:

$$\text{Prob}(m_A - dm/2 < m'_A \leq m_A + dm/2) =$$

$$\frac{1}{S_A \sqrt{2\pi}} \cdot e^{-\frac{1}{2}(\frac{M-m'_A}{S_A})^2} \cdot dm$$

where dm is the differential element of variable m.

In set $W_B$, the probability of achieving a value $m'_B$ as close as possible to the value $m_B$ is expressed:

$$\text{Prob}(m_B - dm/2 < m'_B \leq m_B + dm/2) =$$

$$\frac{1}{S_B \sqrt{2\pi}} \cdot e^{-\frac{1}{2}(\frac{M-m'_B}{S_B})^2} \cdot dm$$

When two events A and B are independent, the combined probability of achieving A and B at the same time is expressed:

$$\text{Prob}(A\ B) = \text{prob}(A) \times \text{prob}(B)$$

By performing the changing of variables as follows:

$$x_A = \frac{M - m'_A}{s_A}$$

$$x_B = \frac{M - m'_B}{s_B}$$

The probability of simultaneous achievement, in sets $W_A$ and $W_B$, of values $m'_A$ and $m'_B$ respectively as close as possible to observed values $m_A$ and $m_B$, is expressed:

$$\text{Prob}[(m_A - dm/2 < m'_A < m_A + dm/2)\ (m_B - dm/2 < m'_B < m_B + dm/2)] = \frac{dm^2}{2\pi \cdot S_A \cdot S_B} \cdot$$

$$e^{\frac{-X_A^2}{2}} \cdot e^{\frac{-X_B^2}{2}} = \frac{e^{\frac{-(X_A^2+X_B^2)}{2}}}{2\pi \cdot S_A \cdot S_B} \cdot dm^2$$

Examination of the analytical expression which quantifies the desired probability shows, obviously, that the probability increases monotonically when the expression $$\frac{(X_A^2 + X_B^2)}{2}$$

decreases.

In other words: the probability of obtaining values $m_A$ and $m_B$ in sets $W_A$ and $W_B$, simultaneously, is maximum when the expression $$\frac{X_A^2 + X_B^2}{2}$$

is minimum.
Thus, when:

$$\frac{X_A^2 + X_B^2}{2}$$

is minimum, the most probable desired values of A and B are:

$$m = m_A + S_A X_A = M + m_A - m'_A$$

$$m_B = m_B + S_B X_B = M + m_B - m'_B$$

Since apparatuses A and B measure a single magnitude M, it is necessary to look for the equality of values $_A$ and $_B$.

The logic constraint on estimates m $y=_A-_B$ is noted. The numerical problem is then to calculate simultaneously:

$$\frac{X_A^2 + X_B^2}{2}$$

minimum under the constraint $y=0$.

Since $y=0$, it is tantamount to minimizing the auxiliary function $$z = \frac{X_A^2 + X_B^2}{2} + k \cdot y$$

where k is a new unknown of the problem.

Function z has an extremum when the derivatives, in relation to $X_A$ and $X_B$, cancel one another, i.e.:

$$\frac{\partial z}{\partial x_A} = 0$$

$$\frac{\partial z}{\partial x_B} = 0$$

all calculations performed, these two equations are expressed by the system:

$$\begin{bmatrix} X_A + kS_A = 0 \\ X_B - kS_B = 0 \end{bmatrix} \quad (1)$$

Variables $X_A$ and $X_B$, replaced in the expression of the constraint $(m_A + S_A X_A = m_B + S_B X_B)$, then gives:

$$kS_A^2 + S_B^2 = m_A - m_B$$

i.e.:

$$k = \frac{m_A - m_B}{S_A^2 + S_B^2}$$

The value of K referred to in system (1) gives:

$$X_A = \frac{-S_A \cdot (m_A - m_B)}{S_A^2 + S_B^2}$$

$$X_B = \frac{S_B \cdot (m_A - m_B)}{S_A^2 + S_B^2}$$

Finally:

Finally:

$$m_A = m_A - \frac{S_A^2 \cdot (m_A - m_B)}{S_A^2 + S_B^2}$$

$$m_B = m_B + \frac{S_B^2 \cdot (m_A - m_B)}{S_A^2 + S_B^2}$$

The numerical application of the preceding results is:

$$m_A = 100 - \frac{4(100-105)}{4+16} = 100 + 1 = 101$$

$$m_B = 105 + \frac{16(100-105)}{4+16} = 105 - 4 = 101$$

The most probable value (and certainly not the closest value) of M is equal to 101.

The coherent values of measurements $_A$ and $_B$ are:

$$_A = _B = 101$$

The certainty of obtaining values m closer to the true value than the raw values m is obtained by multiplying the raw measurement readings and their processing.

The reduction of error is 50% for measurement A and 66% for measurement B in the case where the true value is equal to 102, and the residual error of B then changes direction.

The effectiveness of the treatment increases with the number of redundancies of the raw measurements and with the number of repeated processings.

In the application under consideration of the regulating device of the invention at a plant for obtaining sulfur, experience shows that the coherence processing performed on the values of the measured flows and contents makes possible an operation of this plant at an optimum efficiency. In plants of the prior art, which do not use this coherence processing in this type of application, and which in particular do not treat by coherence flow values of the reactive compounds at input as well as the values of these compounds at output, the efficiency is much less.

The coherence processings also make it possible to establish intervals of values inside of which the measured values must be located. When the values of one of the measured parameters, for example, are not located in the corresponding predetermined interval, it is possible to trigger an alarm which optionally makes it possible to stop the operation of the plant since under these conditions there is probably a failure in the operation of the plant.

In the application under consideration, the coherence processings make it possible to refine the prediction of the airflow necessary for the reaction with the input acid gases.

The coherence processings make it possible to reduce the variances of the measurements taken and thus to increase the stability of the operation of the entire plant. Consequently, at the established regulating speed, it is no longer necessary to take measurements as often as in plants whose operation variant is great.

The regulating device which has just been described, particularly for a plant for obtaining sulfur, of course, can be used for any other type of chemical treatment plant.

We claim:

1. A device for regulating operations of a chemical treatment plant to improve efficiency by attenuation of variances of adjustment parameters wherein said plant comprises:
   chemical treatment means connected to adjustable flow means for feeding respectively the chemical treatment means with input reactive chemical compounds, said plant providing at said plant's output at least one chemical element present in the input compounds, and wherein said regulating device comprises:

measuring means providing signals indicative of the measurement of input flows of compounds;

means for providing signals of measurements of contents of any residual input compounds which are still present at an output of the treatment means;

flow regulating means connected to the means for providing measuring signals indicative of the contents of any residual compounds and to the adjustable flow means;

said regulating means having an input for receiving a set-point signal to apply a signal to the adjustable flow means for modifying the flow of the corresponding input compound, so as to cause the contents of any of the output residual compounds to tend toward zero values, said regulating device also comprising calculation means connected to the means for measuring said flows of the input compounds, and to said means for measuring the contents of any residual portions of the input compounds still present at an output of the treatment means, and to said measuring means providing measurement signals of the contents of the input compounds, the calculation means performing coherence processings of measurement values of flows and contents, attenuating any variances of the measured flows and contents, the calculation means providing on an output a set-point signal improved by the coherence processing performed by said calculation means and applied to the regulating means.

2. The device according to claim 1, wherein the regulating means comprises: a flow regulator having an output connected to a solenoid value of the adjustable flow means, so as to provide to this solenoid valve corrected control signal.

3. The device according to claim 1, wherein the regulating means comprises a flow regulator one output of which provides a control signal of a solenoid valve of the adjustable means, and an adder connected by an input to the output of the regulator, another input of this adder being connected to the output of the calculation means to receive the set-point signal, an output of this adder providing a corrected control signal of a solenoid valve of the adjustable flow means.

4. The device according to claims 2 or 3, wherein the input compounds are hydrogen sulfide and air, with an element at the output being sulfur.

* * * * *